Feb. 17, 1970    W. R. LONG    3,495,727
BACKHOE
Filed Jan. 19, 1968    3 Sheets-Sheet 1

INVENTOR
WILLIAM R. LONG

BY
ATTORNEYS

Feb. 17, 1970  W. R. LONG  3,495,727
BACKHOE

Filed Jan. 19, 1968  3 Sheets-Sheet 2

INVENTOR
WILLIAM R. LONG

BY
ATTORNEYS

Feb. 17, 1970 W. R. LONG 3,495,727
BACKHOE
Filed Jan. 19, 1968 3 Sheets-Sheet 3
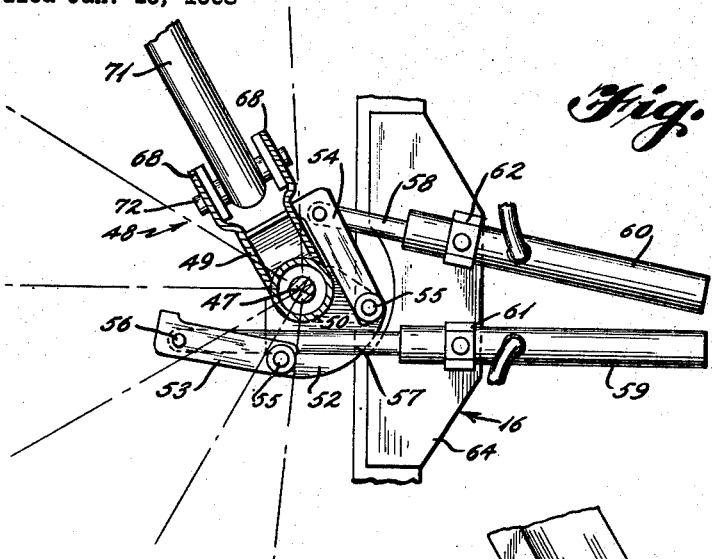
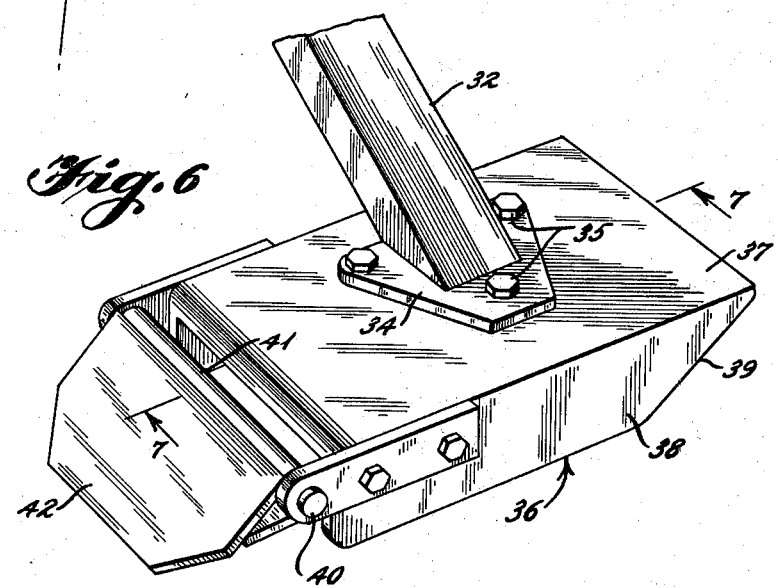
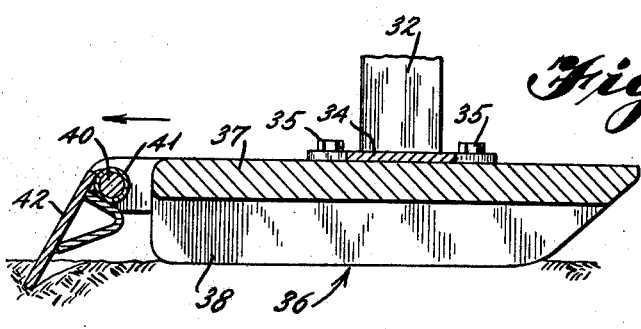
INVENTOR
WILLIAM R. LONG
BY
ATTORNEYS United States Patent Office 3,495,727
Patented Feb. 17, 1970

3,495,727
BACKHOE
William R. Long, Tarboro, N.C., assignor to Long
Manufacturing Company, Inc., Tarboro, N.C.
Filed Jan. 19, 1968, Ser. No. 699,094
Int. Cl. E02f 3/75
U.S. Cl. 214—138                     4 Claims

ABSTRACT OF THE DISCLOSURE

Earth excavating apparatus having an articulated boom mounted on the hitch of a propelling vehicle and having self-contained operating means driven by means of the power takeoff of the vehicle to swing the boom from side to side.

BACKGROUND OF THE INVENTION

Field of the invention

This invention relates generally to material or article handling equipment and particularly to equipment mounted on a propelling vehicle and adapted to swing from side to side about a generally vertical pivot.

Description of the prior art

Efforts have been made to provide a backhoe or other article handling device removably mountable on a propelling vehicle and operated independently thereof. Such prior art devices have been mounted directly on the frame of the vehicle and have utilized the hydraulic system of the vehicle as a source of power. Due to the complex mounting and connecting means, these devices have not been satisfactory since they have been difficult to apply and maintain, have been restricted in lateral movement of the boom, have caused the operator's station to be located in a difficult position, and have been excessively expensive to own and operate on a part-time basis.

SUMMARY

The present invention is a backhoe having fixed and movable frames with a plurality of mounting pins by means of which the fixed frame can be mounted on the draft arms of a propelling vehicle. The backhoe has a self-contained hydraulic unit connected to and driven by means of the power takeoff of the vehicle. A pair of telescopic support legs extend outwardly and downwardly from the fixed frame and each of such legs has a ground engaging pad on the lowermost end. The pads are arranged in such a manner that they will permit forward movement but will resist or prevent lateral and rearward movement so that the vehicle can move forwardly without raising the pads out of engagement with the earth. The fixed frame has a generally vertically disposed pivot on which the movable frame is rotatably mounted. A boom is mounted for up and down movement on the movable frame and means is provided for controlling the position of such boom. A dipper stick is pivotally mounted on the end of the boom and a scoop or bucket is mounted on the end of the dipper stick.

It is an object of the invention to provide a relatively simple, practical, comparatively inexpensive, efficient backhoe attachment having a self-contained hydraulic system which can be easily and quickly attached to and detached from a propelling vehicle.

Another object is to provide a backhoe having an adjustable ground engaging pad which will permit forward movement of the vehicle without removing the pads from the earth but which will resist or prevent lateral or rearward movement.

A further object of the invention is to provide a backhoe attachment having a frame with a generally vertical pivot, a boom mounted on such pivot, and improved means for controlling the angular position of the boom.

BRIEF DESCRIPTION OF THE DRAWINGS

FIG. 5, a fragmentary section illustrating the means for controlling the position of the boom;

FIG. 6, an enlarged perspective of one of the ground engaging pads; and

FIG. 7, a section on the line 7—7 of FIG. 6.

DESCRIPTION OF THE PREFERRED EMBODIMENT

Figure 1:
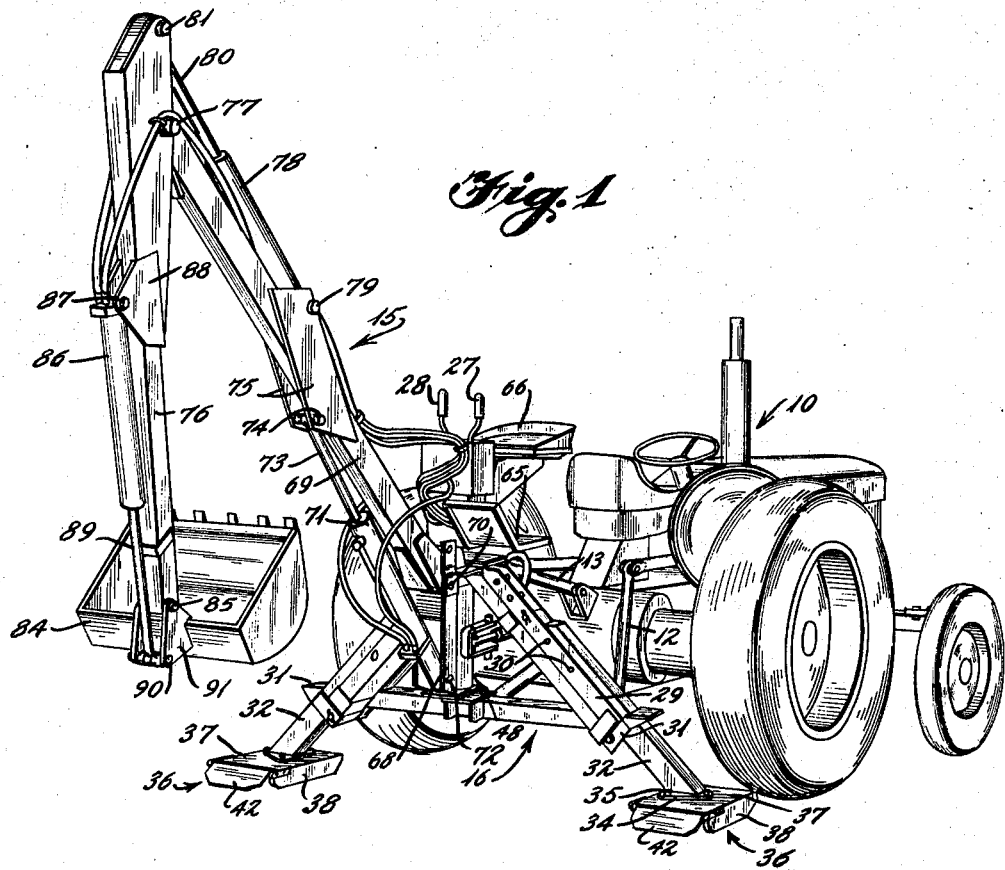
FIG. 1 is a rear perspective illustrating one application of the invention attached to a propelling vehicle.
Figure 2:
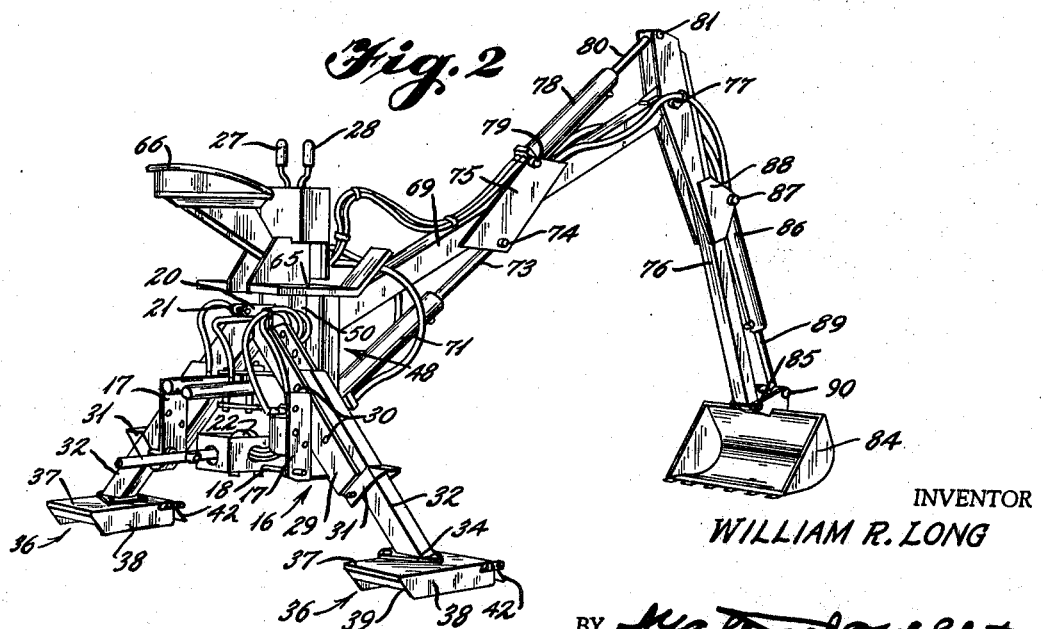
FIG. 2, a front perspective of the backhoe assembly itself.
Figure 3:
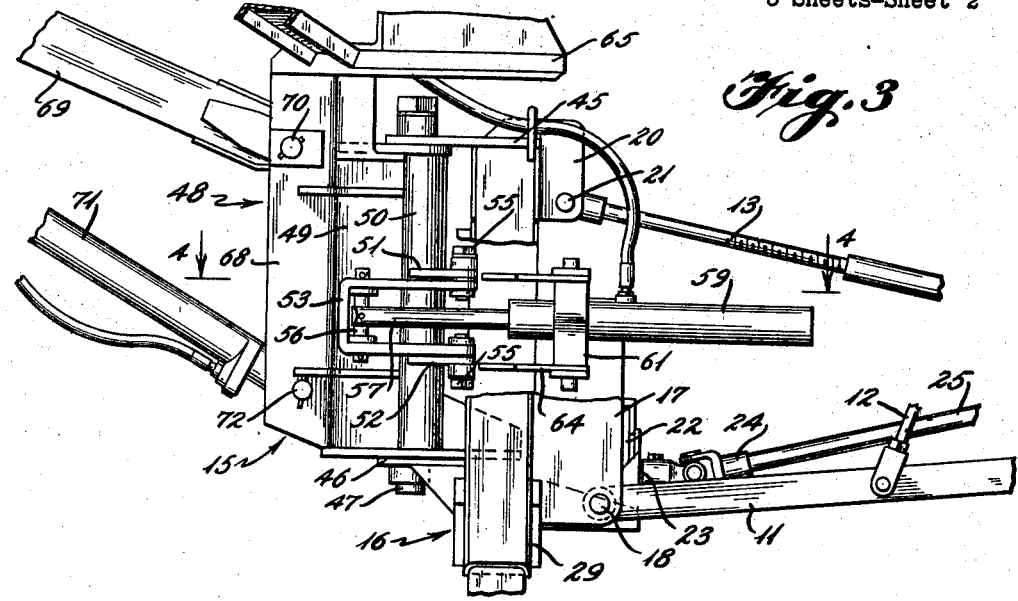
FIG. 3, an enlarged fragmentary side elevation of the backhoe mounting means.

With continued reference to the drawings, a tractor or other propelling vehicle 10 is provided having a power takeoff (not shown) and a conventional three-point hitch including a pair of rearwardly extending draft arms 11 controlled by lift arms 12 and an adjustable upper link 13.

A backhoe 15 is provided having a fixed mounting frame 16 with a pair of forwardly extending plate members 17. Each of the plate members is provided with a laterally disposed mounting pin 18 which receives the free ends of the draft arms 11. Preferably the pins 18 protrude from both sides of the plate members 17 with one end portion being of a size to accommodate a category 1 draft connection and the other end portion being of a size to accommodate a category 2 draft connection. The draft arms are adapted to be locked on the pins 18 in any desired manner, as by lock pins 19. At the upper portion of the frame a pair of forwardly extending lugs 20 are provided having a mounting pin 21 which receives the free end of the upper link 13 to complete the connection between the three-point hitch and the fixed frame 16.

At the lower portion of the frame 16 intermediate the plate members 17 a hydraulic motor 22 is provided having a shaft 23 on which is mounted a universal connection 24 the opposite end of which is mounted on a telescopic drive shaft 25 connected to the power takeoff of the vehicle. The motor 22 receives fluid from a reservoir 26 and directs such fluid under pressure through a plurality of distributor valves controlled by operating levers 27 and 28 to selectively operate a plurality of hydraulic members, as will be described later.

Each side of the frame 16 has an outwardly and downwardly inclined U-shaped channel 29 with a plurality of spaced opposed openings 30 along each upstanding flange. The lowermost end of the channel 29 has a bridge or inverted U-shaped strap 31 extending over the channel 29 and serving the dual purpose of providing a step and providing a guideway for a telescopic leg 32. The upper end of the leg 32 has an opening for a bolt or pin 33 which extends through such leg and through pairs of opposed openings 30 to lock the channel 29 and the leg together in assembled relation.

The outer end of the leg 32 is welded or otherwise attached to a mounting plate 34 which in turn is connected by bolts or other fasteners 35 to a ground engaging pad 36. Such pad has a body 37 with a downwardly turned flange 38 along the inner and outer sides thereof. The pad has a tapered forward end 39 and the rear end of the flanges 38 extend beyond the body 37 and are connected together by a shaft 40. A sleeve 41 is freely rotatably mounted on the shaft 40 and such sleeve is welded or otherwise permanently attached to the upper portion of an anchor plate 42. The anchor plate 42 is longer in length than the flanges 38 and therefore is adapted to engage the earth at an angle as illustrated in FIG. 7. Since the anchor plate 42 is freely pivotally mounted and normally is disposed rearwardly at an angle, it will slide over the ground when moved forwardly but will dig into or embed itself in the earth sufficiently to prevent any rearward movement of the pad 36. With this construction the flanges 38 will resist or prevent any side movement and the anchor plate 42 will prevent any rearward movement.

The frame 16 has a top plate 45 attached to the top and extending rearwardly thereof and a lower plate 46 spaced upwardly from the bottom and extending rearwardly generally parallel with the top plate 45. A shaft 47 is carried by and extends between the plates 45 and 46 generally parallel with the fixed frame 16.

A movable frame 48 is provided having a generally upright post 49 with a sleeve 50 fixed thereto. The sleeve is freely rotatably mounted about the vertical shaft 47. In order to control the position of the movable frame, the sleeve 50 is provided with a pair of spaced generally parallel wedge-shaped lugs 51 and 52 connected to the forward portion of the sleeve 50. A pair of U-shaped yokes 53 and 54 are journaled at opposite sides of the lugs 51 and 52 by pivot pins 55. Each of the yokes 53 and 54 is provided with a pivot 56 intermediate the ends thereof to which one end of piston rods 57 and 58 carried by fluid cylinders 59 and 60, respectively, is attached. The cylinders are fixed within support members 61 and 62 which in turn are rotatably mounted on a pair of spaced generally parallel brackets 63 and 64 carried by the fixed frame 16.

Figure 4:
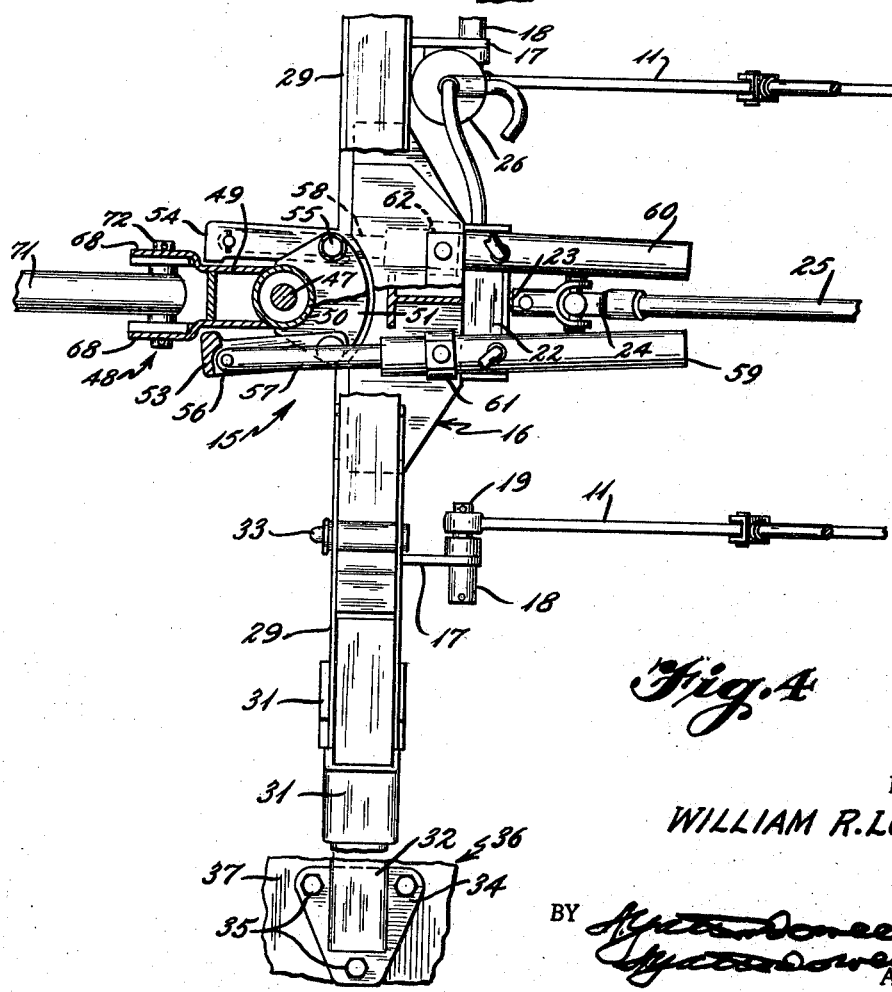
FIG. 4, a section on the line 4—4 of FIG. 3.

When it is desired to rotate the movable frame 48 fluid under pressure is introduced into one of the cylinders 59 or 60 to cause a piston rod to be extended and push the U-shaped yoke 53 or 54 in a rearward direction, which in turn will pull the lugs 51 and 52 in that direction and rotate the sleeve 50 about the shaft. The U-shaped yoke on the opposite side of the sleeve will cause the piston rod of the other cylinder to be retracted, as illustrated in FIG. 5. With reference to FIGS. 4 and 5 it will be noted that the cylinders 59 and 60 are located close together and are generally parallel with each other, although they are pivoted for slight movement relative to each other.

A platform 65 is fixed to the top of the post 49 and such platform is adapted to support the distributor valves and operating levers 27 and 28, as well as a seat 66 for the operator of the backhoe, so that when the movable frame 48 is moved, the seat 66 and the operator likewise will be moved.

The rear end of the upright post 49 is provided with a pair of spaced generally parallel flanges 68 between the upper ends of which is pivotally mounted a boom 69 by means of a pivot pin 70. In order to raise and lower such boom a fluid cylinder 71 is pivotally connected to the lower portion of the flanges 68 by a pivot pin 72 and such cylinder has a piston rod 73 the free end of which is connected to a pivot pin 74 carried by a pair of plates 75 which are welded or otherwise attached to the boom 69 and extend above and below the same.

A dipper stick 76 is pivotally mounted intermediate its ends on the outer end of the boom 69 by means of a pivot 77. In order to control the position of the dipper stick 76 a fluid cylinder 78 is pivotally connected to the upper portion of the plates 75 by a pivot 79 and such cylinder is provided with a piston rod 80, the free end of which is connected to one end of the dipper stick 76 by a pivot 81. Extension and contraction of the piston rod 80 will cause the dipper stick 76 to pivot about the end of the boom 69.

A scoop or bucket 84 is connected to the opposite end of the dipper stick by a pivot 85 and such scoop is controlled by a fluid cylinder 86 one end of which is mounted on a pivot 87 carried by a pair of brackets 88 fixed to the dipper stick 76. The fluid cylinder 86 has a piston rod 89 the free end of which is connected by a pivot 90 to a pair of brackets 91 carried by the scoop 84. It will be noted that the scoop 84 can be of various shapes and sizes and it is contemplated that a plurality of shapes and sizes will be provided for the backhoe 15.

In the operation of the device a tractor or propelling vehile 10 is backed toward the backhoe 15 until the draft arms 11 and the upper link 13 can be connected to mounting pins 18 and 21, respectively, and the drive shaft 25 can be connected to the power takeoff of the vehicle. The lift arms 12 of the tractor are then operated to raise the backhoe out of engagement with the ground and the tractor is driven to the site where the backhoe is to be used. When the tractor is in position the lift arms 12 are lowered until the pads 36 engage the ground and the weight of the backhoe is supported by the pads. The operator then mounts the seat 66 and by controlling the operating levers 27 and 28 can begin the digging operation. It is noted that the operating lever 27 will control the fluid cylinders 59 and 60 in one position and will control fluid cylinder 71 in another position, and the operating lever 28 will control the fluid cylinder 78 in one position and the fluid cylinder 86 in a second position. By manipulating the levers 27 and 28 the operator can cause the scoop 84 to penetrate the earth and fill the scoop after which the boom 69 can be raised and rotated and the scoop can be emptied. When it is necessary to move the backhoe to a new position, the operator merely mounts the tractor seat and drives the tractor forward without raising the backhoe out of engagement with the earth.

The backhoe may also be moved without the operator leaving the backhoe seat. This is accomplished by pushing the vehicle forward by extending the dipper stick while maintaining ground engagement with the bucket teeth or cutting edge.

It will be apparent that a relatively simple, inexpensive backhoe has been provided having a self-contained hydraulic unit driven by the power takeoff of the tractor and such backhoe can be quickly and easily attached to the three-point hitch of the tractor for ease of transportation.

It will be obvious to one skilled in the art that various changes may be made in the described embodiment of the invention without departing from the spirit and scope thereof and therefore the invention is not limited by that which is illustrated in the drawings and described in the specification, but only as indicated in the accompanying claims.

What is claimed is:

1. A backhoe for mounting on the implement hitch of a propelling vehicle having a power takeoff, said backhoe comprising a fixed frame, means on said fixed frame providing connections for the hitch of the propelling vehicle, a fluid motor operatively associated with said fixed frame and having a connection to be driven by means of the power takeoff of the vehicle, a plurality of adjustable extensions carried by said fixed frame, a ground engaging pad secured to each of said extensions, said pad including a body having downwardly extending flanges along each side adapted to engage the earth and prevent lateral movement of the pad, shaft means located at the rear of said body, an anchor plate rotatably mounted on said shaft means, said anchor plate extending downwardly and rearwardly into engagement with the earth to prevent rearward movement of the pad while permitting forward movement, a generally vertically disposed shaft carried by said fixed frame, a movable frame including an upright post rotatably supported on said vertically disposed shaft, an operator's platform mounted on said movable frame, a boom pivotally mounted on said movable frame, fluid means carried by said movable frame for controlling the position of said boom, a dipper stick pivotally mounted onto the end portion of said boom, fluid means for swinging said dipper stick about the end of said boom, scoop means pivotally mounted on said dipper stick, fluid means controlling the position of said scoop means, and means for rotating said movable frame about said vertically disposed shaft, whereby said backhoe can be mounted on the hitch of a propelling vehicle and operated by a self-contained unit.

2. The structure of claim 1 in which said means for rotating said movable frame includes a pair of yokes pivotally connected to opposite sides of said movable frame, a pair of fluid cylinder means located generally parallel to each other and pivotally mounted on said fixed frame, and each of said fluid cylinder means having piston rod means connected to said yokes, whereby when one of said piston rod means is extended said movable frame will be pivoted about said vertically disposed shaft to cause the other piston rod means to be retracted.

3. A ground engaging pad for the leg of a backhoe comprising an elongated body, a downwardly extending flange disposed along each side of said body and extending rearwardly thereof, shaft means carried by said flanges rearwardly of said body, and anchor plate means swingably mounted on said shaft means, whereby said flanges and said anchor plate will engage the earth and prevent lateral or rearward movement of the pad but will permit forward movement thereof.

4. In a backhoe having a fixed frame with a movable frame swingably mounted thereon, apparatus for controlling the position of said movable frame relative to said fixed frame comprising a pair of spaced generally parallel fluid cylinder means, first pivot means mounting said cylinder means on said fixed frame, a piston rod carried by each of said cylinder means, a pair of spaced bracket means fixed to said movable frame adjacent to said fixed frame and extending outwardly on both sides of said movable frame, a U-shaped yoke mounted by second pivot means on said bracket means at each side of said movable frame, said piston rods being swingably connected by third pivot means to said yokes in spaced relation to said bracket means, whereby when one of said piston rods is extended it will push one of said yokes and pull said bracket means to cause said movable frame to swing relative to said fixed frame.

References Cited
UNITED STATES PATENTS 3,057,494 10/1962 Holopainen et al. ____ 214—138
3,243,064 3/1966 Thwaites _____ 214—138
3,275,163 9/1966 Schaeff _____ 214—138 X HUGO O. SCHULZ, Primary Examiner U.S. Cl. X.R.

212—66, 145